United States Patent
Hathiramani

(10) Patent No.: US 11,997,504 B2
(45) Date of Patent: May 28, 2024

(54) DYNAMIC SPECTRUM SHARING REDUCED OVERHEAD OPERATION

(71) Applicant: NOKIA SOLUTIONS AND NETWORKS OY, Espoo (FI)

(72) Inventor: Navin Hathiramani, Coppell, TX (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/084,112

(22) Filed: Dec. 19, 2022

(65) Prior Publication Data

US 2023/0199510 A1    Jun. 22, 2023

(30) Foreign Application Priority Data

Dec. 21, 2021  (FI) ..................................... 20216311

(51) Int. Cl.
  *H04W 16/14* (2009.01)
  *H04L 1/00* (2006.01)
  *H04W 24/08* (2009.01)

(52) U.S. Cl.
  CPC ........... *H04W 16/14* (2013.01); *H04L 1/0067* (2013.01); *H04W 24/08* (2013.01)

(58) Field of Classification Search
  None
  See application file for complete search history.

(56) References Cited

U.S. PATENT DOCUMENTS

| | | |
|---|---|---|
| 2012/0176902 A1 | 7/2012 | Dinan et al. |
| 2018/0069660 A1* | 3/2018 | Yi .......................... H04L 5/0048 |
| 2018/0192404 A1* | 7/2018 | Maaref ................. H04L 5/0094 |
| 2019/0349998 A1* | 11/2019 | Bhattad ................. H04L 1/0013 |
| 2019/0379506 A1 | 12/2019 | Cheng |
| 2020/0053758 A1 | 2/2020 | Hosseini et al. |
| 2020/0100225 A1 | 3/2020 | Khoshnevisan et al. |
| 2020/0304232 A1 | 9/2020 | Park et al. |
| 2021/0058953 A1 | 2/2021 | Bendlin et al. |
| 2023/0081776 A1* | 3/2023 | Kim ...................... H04L 5/0051 370/329 |

FOREIGN PATENT DOCUMENTS

| | | |
|---|---|---|
| WO | 2017039496 A1 | 9/2017 |
| WO | 2020/167180 A1 | 8/2020 |
| WO | 2021/000284 A1 | 1/2021 |
| WO | 2021/244561 A1 | 12/2021 |

OTHER PUBLICATIONS

Office Action—Opinion on Patentability dated Jun. 22, 2022 corresponding to Finnish Patent Application No. 20216311.
Finnish Search Report dated Jun. 22, 2022 corresponding to Finnish Patent Application No. 20216311.
Office Action—Communication of Acceptance dated Nov. 20, 2023 corresponding to Finnish Patent Application No. 20216311.
Extended European Search Report dated Oct. 6, 2023, corresponding to European Patent Application No. 22210791.4.

* cited by examiner

*Primary Examiner* — Faruk Hamza
*Assistant Examiner* — Cassandra L Decker
(74) *Attorney, Agent, or Firm* — SQUIRE PATTON BOGGS (US) LLP

(57) ABSTRACT

In dynamic spectrum sharing between a first radio access type and a second radio access type, information indicating indirectly whether a minimum resources are reserved for downlink reference transmissions of the first radio access type, is used to determine in devices rate matching scheme to be used, or to determine resources which can be used.

14 Claims, 4 Drawing Sheets

DYNAMIC SPECTRUM SHARING REDUCED OVERHEAD OPERATION

CROSS REFERENCE TO RELATED APPLICATION

This application claims the benefit of Finnish Patent Application No. 20216311, filed Dec. 21, 2021. The entire content of the above-referenced application is hereby incorporated by reference.

TECHNICAL FIELD

Various example embodiments relate to wireless communications.

BACKGROUND

Wireless communication systems, including spectrum usage, are under constant development. Dynamic spectrum sharing provides spectrum flexibility required for different purposes, for example allowing different access modes to share the same spectrum.

BRIEF DESCRIPTION

According to an aspect there is provided an apparatus comprising at least one processor; and at least one memory including computer program code, the at least one memory and computer program code being configured to, with the at least one processor, cause the apparatus at least to perform: supporting cell spectrum sharing between a first radio access type and a second radio access type; monitoring downlink transmissions at least in a cell providing the second radio access type; maintaining at least two different rate matching schemes, wherein a first rate matching scheme defines a minimum number of resources reserved for downlink reference transmissions of the first radio access type; receiving, over the cell providing the second radio access type, control information comprising a first indication of the first rate matching scheme; and performing rate matching using, in response to receiving the first indication, the first rate matching scheme until control information indicating to use another rate matching scheme is received.

In an embodiment, the at least one memory and computer program code are configured to, with the at least one processor, cause the apparatus further at least to perform: receiving the first indication as a bit set to a first value in a downlink control indicator; and receiving as an indication to use another rate matching scheme a downlink indicator with said bit set to a second value.

In embodiments, the first rate matching scheme is a single port rate matching scheme defining resources reserved for channel reference symbols.

According to an aspect there is provided an apparatus comprising at least one processor; and at least one memory including computer program code, the at least one memory and computer program code configured to, with the at least one processor, cause the apparatus at least to perform: providing at least a cell using a first radio access type; supporting at least in said cell spectrum sharing with a second radio access type; determining an operation mode of said cell at least based on number of devices, which use the first radio access type, connected to said cell; using, at least when the number of devices is zero, in said cell a first operation mode, which is an operation mode, in which a minimum number of resources are reserved for downlink reference transmissions for the first radio access type; and causing, in response to the operation mode being changed to the first operation mode or from the first operation mode, informing the operation mode change to an entity of the second radio access type with which the spectrum is shared in said cell of the first radio access type.

In an embodiment, the at least one memory and computer program code are configured to, with the at least one processor, cause the apparatus further at least to perform: reserving in the first operation mode no physical uplink control channel resources for the first radio access type; detecting, when the first operation mode is in use, a first information indicating that the number of devices connected to said cell will change to be more than zero; and changing the first operation mode to a second operation mode, in which physical uplink control channel resources are reserved for the first radio access type.

In embodiments, the at least one memory and computer program code are configured to, with the at least one processor, cause the apparatus further at least to perform: sharing in the first operation mode random access channel resources reserved for the first radio access type with at least a cell of the second radio access type; and separating in the second operation mode the random access channel resources reserved for the first radio access type from the random access resources of the cell of the second radio access type.

In embodiments, the at least one memory and computer program code are configured to, with the at least one processor, cause the apparatus further at least to perform: determining, in response to the first information being an acceptance of a handover of a device or a device entering a connected mode, capability of the device; and determining at least based on the capability a number of resources reserved for downlink reference transmissions for the first radio access type in the second operation mode.

In embodiments, the at least one memory and computer program code are configured to, with the at least one processor, cause the apparatus further at least to perform: using in the second operation mode a preconfigured number of resources reserved for downlink reference transmissions for the first radio access type.

In embodiments, the first operation mode is a single port transmission mode.

According to an aspect there is provided an apparatus comprising at least one processor; and at least one memory including computer program code, the at least one memory and computer program code being configured to, with the at least one processor, cause the apparatus at least to perform: providing at least a cell using a second radio access type; supporting at least in said cell spectrum sharing with a first radio access type; receiving from an entity of the first radio access type, with which the spectrum is shared, information indicating whether a first operation mode, which is an operation mode, in which a minimum number of resources are reserved for downlink reference transmissions for the first radio access type, is in use; in response to receiving an indication that the first operation mode is in use, indicating in a downlink control information transmitted from the apparatus to devices in the cell to use a first rate matching scheme, which defines a minimum number of resources reserved for downlink reference transmissions for the first radio access type; and in response to receiving an indication that the first operation mode is not in use, indicating in a downlink control information transmitted from the apparatus to devices in the cell to use another rate matching scheme.

In an embodiment, the at least one memory and computer program code are configured to, with the at least one processor, cause the apparatus further at least to perform: in response to receiving the indication that the first operation mode is in use, using physical uplink control channel resources for the first radio access type when scheduling transmissions of the second radio access type; and in response to receiving the indication that the first operation mode is not in use, not using said physical uplink control channel resources for the first radio access type when scheduling transmissions of the second radio access technology.

In embodiments, the first radio access type is a first radio access technology and the second radio access type is a second radio access technology.

In embodiments, the first radio access technology is a preceding generation technology to the second radio access technology.

In embodiments, the first radio access type is using contiguous spectrum and the second access mode is using a non-contiguous spectrum, or the second radio access type is using a broader non-contiguous spectrum than the first radio access type.

According to an aspect there is provided a method comprising: supporting cell spectrum sharing between a first radio access type and a second radio access type; monitoring downlink transmissions at least in a cell providing the second radio access type; maintaining at least two different rate matching schemes, wherein a first rate matching scheme defines a minimum number of resources reserved for downlink reference transmissions of the first radio access type; receiving, over the cell providing the second radio access type, control information comprising a first indication of the first rate matching scheme; and performing rate matching using, in response to receiving the first indication, the first rate matching scheme until control information indicating to use another rate matching scheme is received.

According to an aspect there is provided a method comprising performing at least one of a first process or a second process, wherein the first process comprises at least following: providing at least a cell using a first radio access type; supporting at least in said cell spectrum sharing with a second radio access type; determining an operation mode of said cell at least based on number of devices, which use the first radio access type, connected to said cell; using, at least when the number of devices is zero, in said cell a first operation mode, which is an operation mode, in which a minimum number of resources are reserved for downlink reference transmissions for the first radio access type; and causing, in response to the operation mode being changed to the first operation mode or from the first operation mode, informing the operation mode change to an entity of the second radio access type with which the spectrum is shared in said cell of the first radio access type; the second process comprises at least following: providing at least a cell using a second radio access type; supporting at least in said cell spectrum sharing with a first radio access type; receiving from an entity of the first radio access type with which the spectrum is shared information indicating whether a first operation mode, which is an operation mode, in which a minimum number of resources are reserved for downlink reference transmissions for the first radio access type, is in use; in response to receiving an indication that the first operation mode is in use, indicating in a downlink control information transmitted from the apparatus to devices in the cell to use a first rate matching scheme, which defines the minimum number of resources reserved for downlink reference transmissions for the first radio access type; and in response to receiving an indication that the first operation mode is not in use, indicating in a downlink control information transmitted from the apparatus to devices in the cell to use another rate matching scheme.

According to an aspect there is provided a computer readable medium comprising program instructions stored thereon for performing at least one of a first process, a second process or a third process, wherein the first process comprises at least following: supporting cell spectrum sharing between a first radio access type and a second radio access type; monitoring downlink transmissions at least in a cell providing the second radio access type; maintaining at least two different rate matching schemes, wherein a first rate matching scheme defines a minimum number of resources reserved for downlink reference transmissions of the first radio access type; receiving, over the cell providing the second radio access type, control information comprising a first indication of the first rate matching scheme; and performing rate matching using, in response to receiving the first indication, the first rate matching scheme until control information indicating to use another rate matching scheme is received; the second process comprises at least following: providing at least a cell using a first radio access type; supporting at least in said cell spectrum sharing with a second radio access type; determining an operation mode of said cell at least based on number of devices, which use the first radio access type, connected to said cell; using, at least when the number of devices is zero, in said cell a first operation mode, which is an operation mode, in which a minimum number of resources are reserved for downlink reference transmissions for the first radio access type; and causing, in response to the operation mode being changed to the first operation mode or from the first operation mode, informing the operation mode change to an entity of the second radio access type with which the spectrum is shared in said cell of the first radio access type; the third process comprises at least following: providing at least a cell using a second radio access type; supporting at least in said cell spectrum sharing with a first radio access type; receiving from an entity of the first radio access type with which the spectrum is shared information indicating whether a first operation mode, which is an operation mode, in which a minimum number of resources are reserved for downlink reference transmissions for the first radio access type, is in use; in response to receiving an indication that the first operation mode is in use, indicating in a downlink control information transmitted from the apparatus to devices in the cell to use a first rate matching scheme, which defines the minimum number of resources reserved for downlink reference transmissions for the first radio access type; and in response to receiving an indication that the first operation mode is not in use, indicating in a downlink control information transmitted from the apparatus to devices in the cell to use another rate matching scheme.

In an embodiment, the computer readable medium is a non-transitory computer readable medium.

According to an aspect there is provided a computer program comprising instructions stored thereon for performing at least one of a first process, a second process or a third process, wherein: the first process comprises at least following: supporting cell spectrum sharing between a first radio access type and a second radio access type; monitoring downlink transmissions at least in a cell providing the second radio access type; maintaining at least two different rate matching schemes, wherein a first rate matching scheme defines a minimum number of resources reserved for downlink reference transmissions of the first radio access type; receiving, over the cell providing the second radio access type, control information comprising a first indication of the first rate matching scheme; and performing rate matching using, in response to receiving the first indication, the first rate matching scheme until control information indicating to use another rate matching scheme is received; the second process comprises at least following: providing at least a cell using a first radio access type; supporting at least in said cell spectrum sharing with a second radio access type; determining an operation mode of said cell at least based on number of devices, which use the first radio access type, connected to said cell; using, at least when the number of devices is zero, in said cell a first operation mode, which is an operation mode, in which a minimum number of resources are reserved for downlink reference transmissions for the first radio access type; and causing, in response to the operation mode being changed to the first operation mode or from the first operation mode, informing the operation mode change to an entity of the second radio access type with which the spectrum is shared in said cell of the first radio access type; the third process comprises at least following: providing at least a cell using a second radio access type; supporting at least in said cell spectrum sharing with a first radio access type; receiving from an entity of the first radio access type with which the spectrum is shared information indicating whether a first operation mode, which is an operation mode, in which a minimum number of resources are reserved for downlink reference transmissions for the first radio access type, is in use; in response to receiving an indication that the first operation mode is in use, indicating in a downlink control information transmitted from the apparatus to devices in the cell to use a first rate matching scheme, which defines the minimum number of resources reserved for downlink reference transmissions for the first radio access type; and in response to receiving an indication that the first operation mode is not in use, indicating in a downlink control information transmitted from the apparatus to devices in the cell to use another rate matching scheme.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first signal could be termed a second signal, and similarly, a second signal could be also termed a first signal without departing from the scope of the present disclosure.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
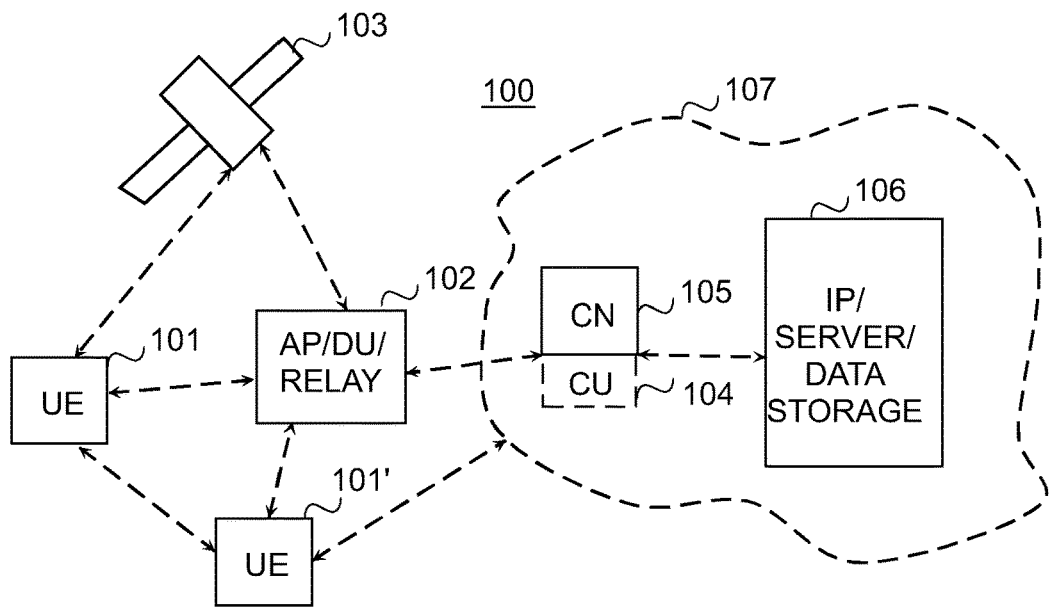
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system 100 given as an example but a person skilled in the art may apply the solution to other communication systems provided with necessary properties.

The example of FIG. 1 shows a part of an exemplifying radio access network.

FIG. 1 shows user devices 101, 101' configured to be in a wireless connection on one or more communication channels with a node 102. The node 102 is further connected to a core network 105. In one example, the node 102 may be an access node such as (e/g)NodeB providing or serving devices in a cell. In one example, the node 102 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), or access and mobility management function (AMF), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The user device may also utilise cloud. In some applications, a user device may comprise a user portable device with radio parts (such as a watch, earphones, eyeglasses, other wearable accessories or wearables) and the computation is carried out in the cloud. The device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The dynamic spectrum sharing allows use the same spectrum bands for different radio access technologies and within the same radio access technologies. For example, smooth migration from one radio access technology to another radio access technology, for example from a preceding (legacy) generation technology to a next generation technology, may be facilitated by the dynamic spectrum sharing. During the migration, by means of the dynamic spectrum sharing it is possible to ensure at least a minimum service level to the legacy generation devices, while enabling an efficient use of the spectrum shared. For example, 5G radio access technology may use the same spectrum, and hence coexist with, LTE radio access technology in a manner that has little impact on a performance of an LTE radio access network when dynamic spectrum sharing is used. Similar kind of coexistence between future radio access networks, e.g. between 6G and 5G, is envisaged. Within the same radio access technology, the dynamic spectrum sharing can be used to facilitate co-existence between devices of the same radio access technology but with differing capabilities, i.e. with different radio access types. These type of coexistence scenarios within a shared spectrum cell are expected to increase as the diversity of uses cases addressed by cellular deployments increases. For example, in 5G, deployment and resource allocations is envisaged in frequency bands of different sizes over an extremely wide range of contiguous or non-contiguous spectrum, both in the form of paired and unpaired frequency bands along with aggregation of different spectrum blocks within and across different bands. Some devices are provided with a capability to operate in a non-contiguous manner over two or more bandwidth parts of the full bandwidth, whereas some devices are provided with a capability to operate over a limited spectrum, for example in a contiguous manner over one bandwidth part of the full bandwidth, or over less bandwidth parts or with restricted spectrum than devices operating on a broader spectrum (in a non-continuous manner). In other words, the devices operating over a limited spectrum may be called capability restricted devices, whereas the devices operating on the broader spectrum may be called non-capability restricted devices.

In the examples below, to for the sake of clarity of the description and to cover both options of spectrum sharing, i.e. intra radio access technology and inter radio access technology spectrum sharing, term "non-predominant device" is used in the examples for devices of the preceding radio access technology, such as the LTE, and for devices with the capability to operate over a limited spectrum, (for the capability restricted devices). Term "predominant device" is used for devices using newer radio access technology, and for devices operating on a broader spectrum (for the non-capability restricted devices). Further, term "first radio access type" is used in the examples for the preceding radio access technology and for the limited spectrum and the "second radio access type" for the newer radio access technology and for the broader spectrum. However, it should be appreciated that the use of the terms is non-limiting, and used just for clarity purposes. For example, the first radio access type may mean the less used radio access type, and/or a number of predominant devices served may be smaller than a number of non-predominant devices.

Figure 2:
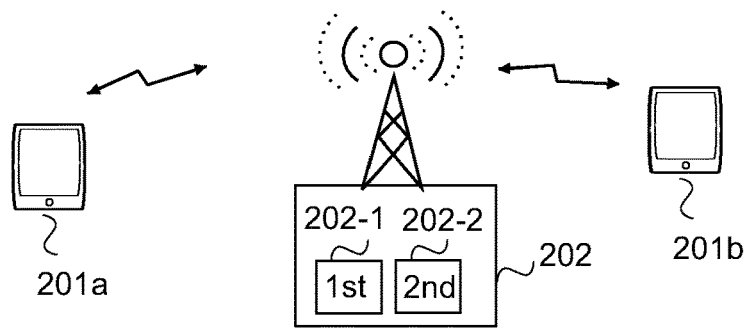
FIG. 2 illustrates an exemplified radio access architecture.

FIG. 2 illustrates a highly exemplified architecture of a radio access network supporting spectrum sharing between the first radio access type and the second radio access type.

In the illustrated example of FIG. 2, an apparatus 202, for example a base station, or 5G new radio node B, or any other apparatus, is configured to provide at least a cell providing the first radio access type and a cell providing the second radio access type to a plurality of devices 201a, 201b, and spectrum sharing at least between said cells. Said cells use the same spectrum or overlapping spectrum over a geographical area. In the illustrated example the apparatus 202 comprises a first scheduling entity 202-1 (1st) for scheduling transmissions in the cell providing the first radio access type and a second scheduling entity 202-2 (2nd) for scheduling transmissions in the cell providing the second radio access type, said scheduling entities being configured to exchange information, either direct information or indirect information, relating to a rate matching scheme, or corresponding reserved or protected resources used, as will be described in more detail below by using the rate matching scheme as non-limiting example. Same principles can be applied to corresponding reserved or protected resources. Hence, herein the term "rate matching scheme" and "rate matching" covers also corresponding reserved or protected resource and how they are applied.

All of the devices 201a, 201b, may be predominant devices or non-predominant devices, or some of them may be predominant devices and some non-predominant devices.

In another example, the cell providing the first radio access type is provided by an apparatus comprising corresponding scheduling entity, and the cell providing the second radio access type is provided by another apparatus comprising corresponding scheduling entity, and they may exchange information over a wired connection or over the air.

Depending on an implementation, the scheduling entities 202-1, 202-2 may exchange information using a proprietary communication or a standardized communication. For example, if the scheduling entity 202-1 is an LTE scheduler and the scheduling entity 202-2 is a new radio scheduler (5G scheduler), the communication may be X2 communication or proprietary communication.

Figure 3:
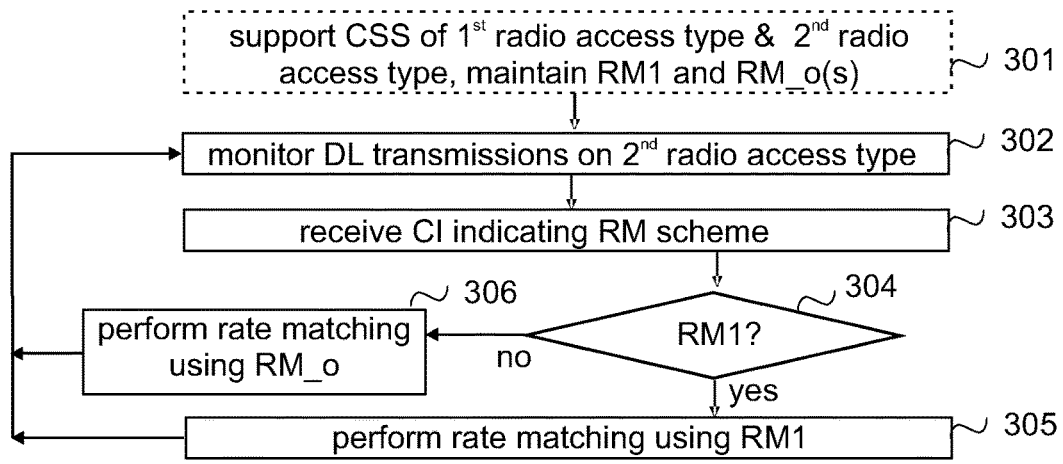
FIGS. 3 to 8 are flow charts illustrating examples of functionalities.

FIG. 3 illustrates an example functionality of a predominant device, or any corresponding apparatus, using the second radio access type, the example functionality not describing transmitting and/or receiving data and related information exchange for the sake of clarity.

Referring to FIG. 3, the predominant device is configured (block 301) to support cell spectrum sharing (CSS), for example a dynamic spectrum sharing, between the first radio access type and the second radio access type and to maintain at least two different rate matching schemes, one of which is a first rate matching scheme (RM1). The first rate matching scheme defines a minimum number of resources reserved for downlink reference transmissions of the first radio access type. The first rate matching scheme may be a single port rate matching scheme defining resources reserved for channel reference symbols for the first radio access type. The first rate matching scheme and/or one or more other rate matching schemes (RM_(o)s) may be semi-statically configured to the predominant device, or configured when the cell is entered.

The predominant device is monitoring (block 302) downlink transmissions on the cell providing the second radio access type, and a control information (CI) comprising a first indication of the first rate matching scheme, i.e. control information indicating (directly or indirectly) a rate matching scheme, is received (block 303). The indication may a bit in a downlink control information. For example, when the bit is set to 1 (on), it indicates the first rate matching scheme, and when the bit is set to 0 (off), it indicates to use another rate matching scheme, for example a baseline rate matching scheme configured semi-statically to the predominant device. Naturally vice versa values may be used, i.e. the bit set to 0 may indicate to use the first rate matching scheme. Still a further possibility to indicate includes that presence of additional control symbols indicate the first rate matching scheme, and absence of the additional control symbols indicate another rate matching scheme, or vice versa. In an implementation in which the spectrum sharing is between 5G and LTE, the predominant device may be configured with the single port rate matching scheme as the first rate matching scheme and with a four port rate matching scheme, for example, as the another rate matching scheme. Naturally, there may be also other rate matching schemes configured to the predominant device.

If the control information indicates that the first rate matching scheme can be used (block 304: yes), the predominant devices performs (block 305) rate matching using the first rate matching scheme. If the control information indicates that the first rate matching scheme cannot be used (block 304: no), the predominant devices performs (block 306) rate matching using another rate matching scheme (RM_o). In other words, rate matching using the first rate matching scheme is performed until control information indicating to use another rate matching scheme is received, and rate matching using another rate matching scheme is performed until control information indicating to use the first rate matching scheme is received.

Figure 4:
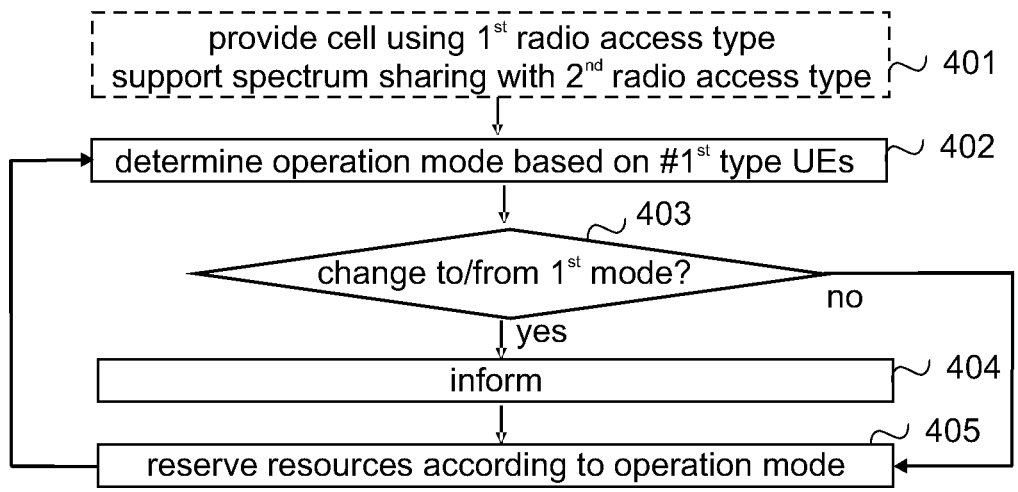

FIG. 4 illustrates an example functionality of an apparatus providing (block 401) at least a cell using the first radio access type and supporting at least in said cell spectrum sharing with the second radio access type, the example functionality not describing transmitting and/or receiving data and related information exchange for the sake of clarity. The apparatus may comprise a separate scheduling entity, for example the first scheduling entity, for the cell, wherein the separate entity may be configured to perform the functionality of blocks 402 to 405 in FIG. 4.

Referring to FIG. 4, an operation mode of said cell is determined (block 402) based on a number (#) of non-predominant devices (UEs), i.e. devices which use the first radio access type, i.e. non-predominant devices, connected to said cell, amongst two or more different operation modes. In the illustrated example, a first operation mode is used in said cell, when the number of non-predominant devices is zero. It should be appreciated that in another example, another number of non-predominant devices may be used as a threshold. However, by having the zero as a threshold, a minimum service level is ensured to non-predominant devices, even when there is only one non-predominant device connected or connecting to said cell. The first operation mode is an operation mode, in which at least a minimum number of resources are reserved for downlink reference transmissions, for example for reference signals, for the first radio access type. In another implementation, in the first operation mode, the minimum number of resources are reserved for downlink reference transmissions and no physical uplink control channel resources are reserved for the first radio access type. In a further implementation, in the first operation mode, the minimum number of resources are reserved for downlink reference transmissions and random access channel resources reserved for the first radio access type are shared with at least a cell of the second radio access type. In a still further implementation, in the first operation mode, the minimum number of resources are reserved for downlink reference transmissions, no physical uplink control channel resources are reserved for the first radio access type and the random access channel resources reserved for the first radio access type are shared with at least a cell of the second radio access type. If determining the operation mode causes (block 403: yes) that the operation mode changes to the first operation mode or changes from the first operation mode to another operation mode, informing the operation mode change to an entity of the second radio access type with which the spectrum is shared in said cell of the first radio access type is caused (block 404). The entity may be the second scheduling entity in the apparatus, or another apparatus. The informing may be performed directly or indirectly, for example using a bit whose value indicates an operation mode or additional control symbols presence or absence indicating the operation mode, in a similar manner than described above with FIG. 3 with the rate matching scheme. For example, X2AP procedures, such as "number of antenna ports" optional filed in an information element "served cell information", may be used. Further resources are reserved (block 405) in said cell for the first radio access type according to the operation mode determined in block 402.

Figure 5:
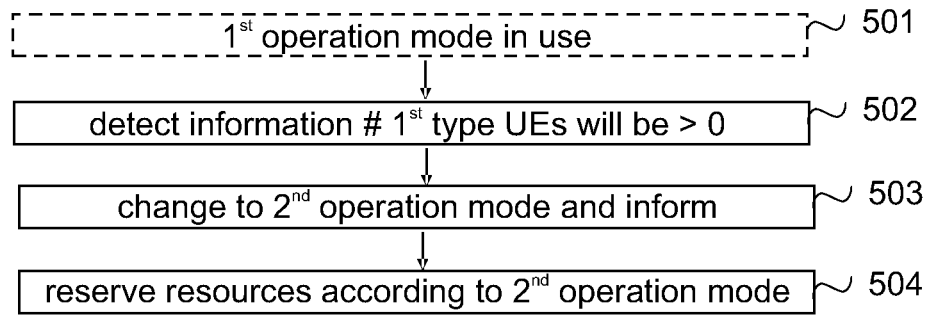

FIG. 5 illustrates a functionality of the apparatus providing at least the cell of the first type, when the first operation mode is in use (block 501). When the first operation mode is in use and information indicating that the number (#) of non-predominant devices (UEs), i.e. devices of the first radio access type, connected to said cell will change to be more than zero, is detected (block 502), the first operation mode is changed (block 503) to be a second operation mode, and resources are reserved (block 504) according to the second operation mode. For example, more resources may be reserved for reference transmissions. In the second operation mode physical uplink control channel resources are reserved (block 504) for the first radio access type. In other words, in implementations in which in the first operation mode no resources are reserved for the physical uplink control channel, said resources for the first radio access type may be reserved on demand, for example when a device is entering a connected mode from an idle mode, or a during a handover. Changing the operation mode from the first operation mode causes informing the operation mode change to the entity of the second radio access type with which the spectrum is shared in said cell of the first radio access type (block 503).

Figure 6:
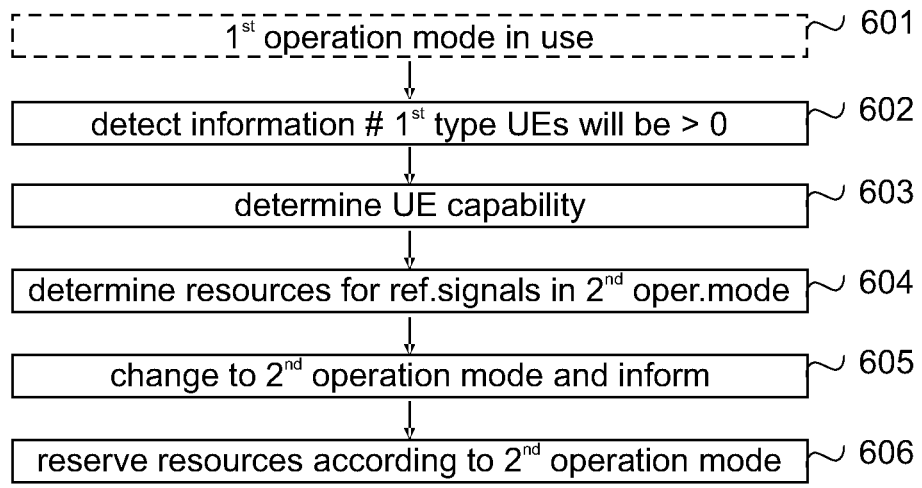

FIG. 6 illustrates a functionality of the apparatus providing at least the cell of the first type, when the first operation mode is in use (block 601). When the first operation mode is in use and information indicating that the number (#) of non-predominant devices (UEs) of the first radio access type connected to said cell will change to be more than zero, is detected (block 602), a capability of a non-predominant device (UE) that will be connected to said cell, will be determined (block 603). Based at least on the capability, a number of resources reserved for reference transmissions for the first radio access type in the second operation mode is determined (block 604). Further, the first operation mode is changed (block 605) to be a second operation mode, in which, resources are reserved (block 606) according to the second operation mode, including the number of resources determined in block 604. In implementations in which in the first operation mode no resources are reserved for the physical uplink control channel, also physical uplink control channel resources are reserved (block 606) for the first radio access type. In other words, resources for the first radio access type are reserved on demand, for example when a device is entering a connected mode from an idle mode, or a during a handover. Changing the operation mode from the first operation mode causes informing the operation mode change to the entity of the second radio access type with which the spectrum is shared in said cell of the first radio access type (block 605).

The detecting in block 502 or in block 602 that the number of non-predominant devices will change to be more than zero may be in response to the first information being an acceptance of a handover of a non-predominant device or a non-predominant device entering a connected mode.

Hence, by changing the operation mode in this early phase, there will be enough time to reserve physical uplink control channel resources for feedback on downlink data transmissions, for example for HARQ-ACK feedback (hybrid automatic repeat request—acknowledgement feedback) in implementations in which they are not reserved in the first operation mode. For example, when the first access type is LTE and the second access type is 5G (new radio), the resources (block 504 or block 606) may be received during a handover request acknowledge.

In an implementation, in the second operation mode, the random access channel resources reserved for the first radio access type are also separated in block 504 or in block 606 from the random access resources of the cell of the second radio access type with which the spectrum is shared. The separate random access channel resources within common resources may be obtained in a plurality of ways, for example by using root sequences and/or different beams.

In one implementation, in the second operation mode, a preconfigured number of resources are reserved in block 504 or in block 606 for reference transmissions for the first radio access type and used for reference transmissions.

As can be seen from the above examples, reservation of additional resources for reference transmissions and/or reservation of physical uplink control channel resources, and/or separate random access control channel resources, can be triggered when needed, and resources released when there is no more any need, (i.e. the number of non-predominant devices is zero).

Figure 7:
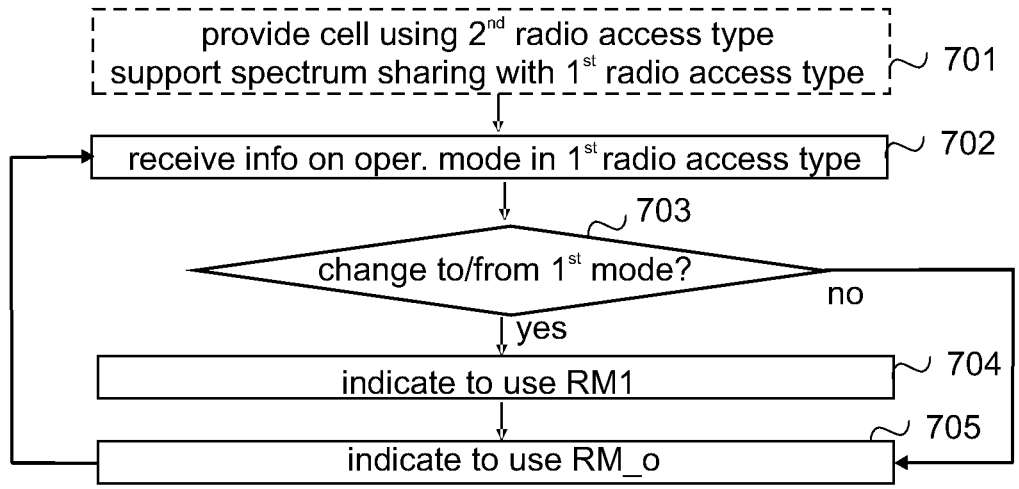

FIG. 7 illustrates an example functionality of an apparatus providing (block 701) at least a cell using the second radio access type and supporting at least in said cell spectrum sharing with the first radio access type, the example functionality not describing transmitting and/or receiving data and related information exchange for the sake of clarity. The apparatus may comprise a separate scheduling entity, for example the second scheduling entity, for the cell, wherein the separate entity may be configured to perform the functionality of blocks 702 to 705 in FIG. 7.

Referring to FIG. 7, information, which indicates whether the first operation mode or another operation mode is in use in a cell providing the first radio access type with which the spectrum is shared, is received (block 702) from an entity of the first radio access type with which the spectrum is shared. The entity wherefrom the information is received may be the first scheduling entity in the apparatus, or another apparatus. Different examples on said information are given above with FIG. 4.

In response to receiving in the information an indication that the first operation mode is in use (block 703:yes), it is indicated (block 704) in a downlink control information transmitted from the apparatus to predominant devices in the cell to use the first rate matching scheme (RM1). Different examples how to indicate the rate matching scheme have been described above with FIG. 3.

In response to receiving an indication that the first operation mode is not in use (block 703: no), it is indicated (block 705) in a downlink control information transmitted from the apparatus to predominant devices in the cell to use another rate matching scheme (RM_o) than the first rate matching scheme.

Figure 8:
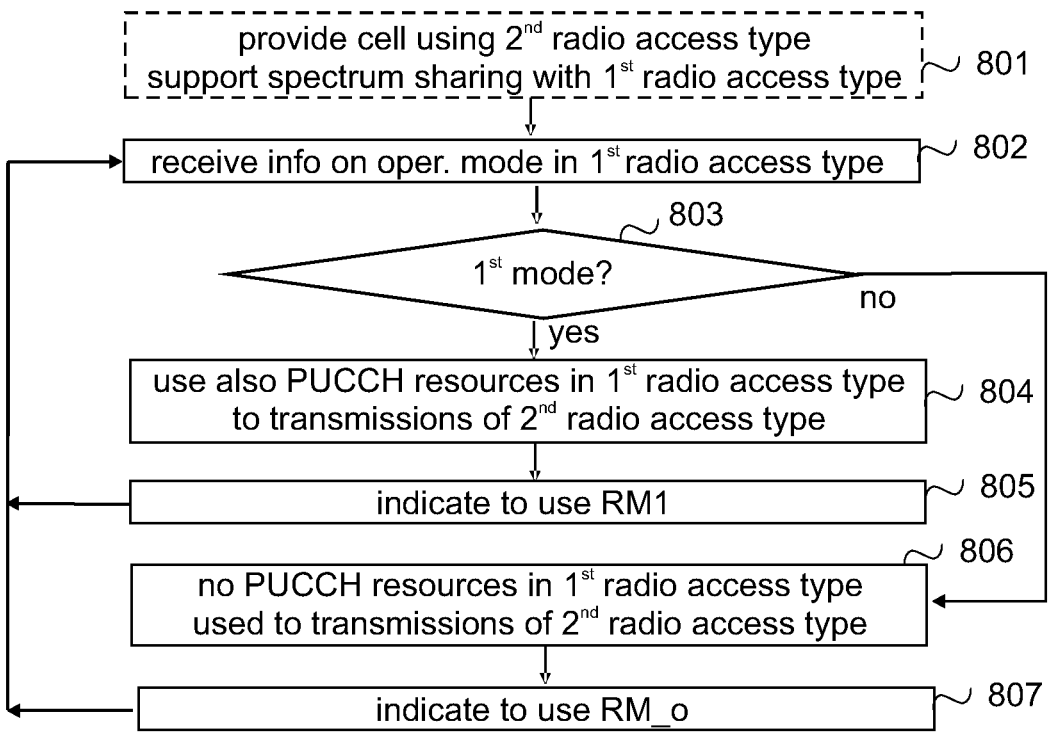

FIG. 8 illustrates another example functionality of an apparatus providing (block 801) at least a cell using the second radio access type and supporting at least in said cell spectrum sharing with the first radio access type, the example functionality not describing transmitting and/or receiving data and related information exchange for the sake of clarity. The apparatus may comprise a separate scheduling entity, for example the second scheduling entity, for the cell, wherein the separate entity may be configured to perform the functionality of blocks 802 to 807 in FIG. 8.

When information, which indicates whether the first operation mode or another operation mode is in use in a cell providing the first radio access type with which the spectrum is shared, is received (block 802) from an entity of the first radio access type with which the spectrum is shared, a decision whether resources for a physical uplink control channel for the first radio access type can be used when resources for transmissions are allocated and scheduled. The entity wherefrom the information is received may be the first scheduling entity in the apparatus, or another apparatus. Different examples on said information are given above with FIG. 4.

In response to receiving in the information an indication that the first operation mode is in use (block 803:yes), said physical uplink control channel resources are also used (block 804), with the resources available otherwise, when scheduling transmissions of the second radio access type, and it is indicated (block 805) in a downlink control information transmitted from the apparatus to predominant devices in the cell to use the first rate matching scheme (RM1). Different examples how to indicate the rate matching scheme have been described above with FIG. 3.

In response to receiving an indication that the first operation mode is not in use (block 803: no), said physical uplink control channel resources are not used (block 806) when scheduling transmissions of the second radio access technology. Further, it is indicated (block 807) in a downlink control information transmitted from the apparatus to predominant devices in the cell to use another rate matching scheme (RM_o) than the first rate matching scheme.

In the examples above it is assumed that the non-predominant devices are sparse and widespread. It is a straightforward for one skilled in the art to apply the functionalities when the predominant devices are sparse and widespread.

As can be seen from the above examples, overhead for the first access type in uplink and downlink can be reduced when the number of connected non-predominant devices is zero. A better uplink performance for second radio access type is obtained when there are no non-predominant devices since the uplink is not fragmented and mor physical resource blocks are available for data transmissions. Yet there is no impact to non-predominant devices.

Further, in embodiments, in which the first radio access type is LTE, use of the single port rate matching scheme reduces interference to cells providing the second radio access type, since in the single port rate matching no cell reference symbols are transmitted. Further, since resource elements are not reserved for physical uplink control channel in the first radio access type in the single transmission mode, this would increase the resource elements usable for physical downlink shared channel in the second radio access type about 4% compared to a situation in which a two port transmission mode would be in use, or about 11% compared to a situation in which a four port transmission mode would be in use.

The blocks, related functions, and information exchanges described above by means of FIGS. 2 to 8 are in no absolute chronological order, and some of them may be performed simultaneously or in an order differing from the given one. Other functions can also be executed between them or within them, and other information may be transmitted. Some of the blocks or part of the blocks or one or more pieces of information can also be left out or replaced by a corresponding block or part of the block or one or more pieces of information. Further, the different implementations described for a block may be freely combined with any of different implementations of another block.

Figure 9:
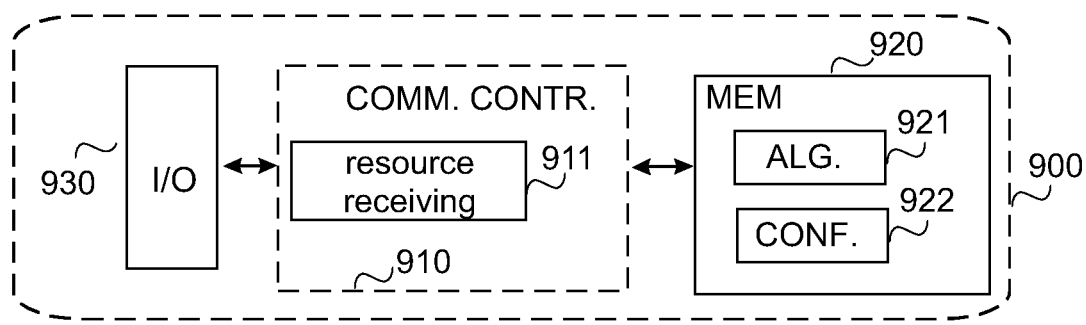
FIGS. 9 and 10 are schematic block diagrams.
Figure 10:
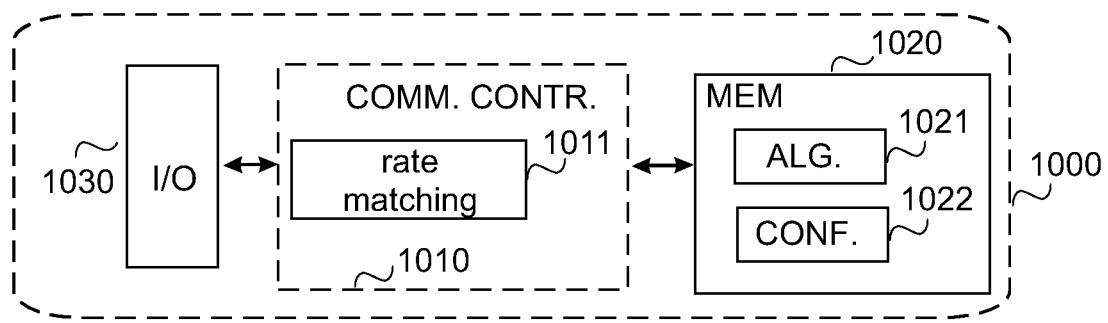

FIGS. 9 and 10 illustrate apparatuses comprising a communication controller 910, 1010 such as at least one processor or processing circuitry, and at least one memory 920, 1020 including a computer program code (software, algorithm) ALG. 921, 1021, wherein the at least one memory and the computer program code (software, algorithm) are configured, with the at least one processor, to cause the respective apparatus to carry out any one of the embodiments, examples and implementations described above. FIG. 9 illustrates an apparatus, for example a base station or an access node or a scheduler, which may be a separate apparatus or comprised in an apparatus, configured at least to reserve radio resources for apparatuses, for example for predominant and/or non-predominant devices, and possibly configured to indicate change of its operation mode. FIG. 10 illustrates an apparatus, for example a predominant device, such as a user equipment, or terminal device in a vehicle, to perform rate matching as possibly indicated by apparatus of FIG. 9. The apparatuses of FIGS. 9 and 10 may be electronic devices, examples being listed above with FIGS. 1 and 2.

Referring to FIGS. 9 and 10, the memory 920, 1020 may be implemented using any suitable data storage technology, such as semiconductor based memory devices, flash memory, magnetic memory devices and systems, optical memory devices and systems, fixed memory and removable memory. The memory may comprise a configuration storage CONF. 921, 1021, such as a configuration database, for example for storing at least temporarily information on operation mode and/or on resources receivable, and/or rate matching schemes. The memory 920, 1020 may further store other data, such as a data buffer for data waiting to be processed (including transmission).

Referring to FIG. 9, the apparatus comprises a communication interface 930 comprising hardware and/or software for realizing communication connectivity according to one or more wireless and/or wired communication protocols. The communication interface 930 may provide the apparatus with radio communication capabilities with predominant devices and/or non-predominant devices, for example with the apparatus of FIG. 10, as well as communication capabilities towards core network.

Digital signal processing regarding transmission and reception of signals may be performed in a communication controller 910. The communication interface may comprise standard well-known components such as an amplifier, filter, frequency-converter, (de)modulator, and encoder/decoder circuitries and, in case wireless communication is supported, one or more antennas.

The communication controller 910 comprises a resource reserving circuitry 911 configured to reserve resources and send/receive information, including internal information exchange, on an operation mode, according to any one of the embodiments/examples/implementations described above. The communication controller 910 may control the resource receiving circuitry 911.

In an embodiment, at least some of the functionalities of the apparatus of FIG. 9 may be shared between two physically separate apparatuses, forming one operational entity. Therefore, the apparatus may be seen to depict the operational entity comprising one or more physically separate apparatuses for executing at least some of the processes described with an apparatus configured at least to reserve radio resources.

Referring to FIG. 10, the apparatus 1000 may further comprise a communication interface 1030 comprising hardware and/or software for realizing communication connectivity according to one or more communication protocols. The communication interface 1030 may provide the apparatus 1000 with communication capabilities with the apparatus of FIG. 9. The communication interface may comprise standard well-known analog components such as an amplifier, filter, frequency-converter and circuitries, conversion circuitries transforming signals between analog and digital domains, and one or more antennas. Digital signal processing regarding transmission and reception of signals may be performed in a communication controller 1010.

The communication controller 1010 comprises a rate matching circuitry 1011 configured to determine a rate matching scheme and perform rate matching using the rate matching scheme according to any one of the embodiments/examples/implementations described above. The communication controller 1010 may control the rate matching circuitry 1011.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 8 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments/examples comprises a circuitry including at least one processor and at least one memory including computer program code. When activated, the circuitry causes the apparatus to perform at least some of the functionalities according to any one of the embodiments/examples/implementations of FIGS. 2 to 8, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the apparatuses (nodes) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 8 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus, comprising:
    at least one processor; and
    at least one memory including computer program code,
        the at least one memory and computer program code configured to, with the at least one processor, cause the apparatus at least to perform:
supporting cell spectrum sharing between a first radio access type and a second radio access type;
monitoring downlink transmissions at least in a cell providing the second radio access type;
maintaining at least two different rate matching schemes, wherein a first rate matching scheme defines a minimum number of resources reserved for downlink reference transmissions of the first radio access type;
receiving, over the cell providing the second radio access type, control information comprising a first indication of the first rate matching scheme; and
performing rate matching using, in response to receiving the first indication, the first rate matching scheme until control information indicating to use another rate matching scheme is received.

2. The apparatus of claim 1, wherein the at least one memory and computer program code are configured to, with the at least one processor, cause the apparatus further at least to perform:
receiving the first indication as a bit set to a first value in a downlink control indicator; and
receiving as an indication to use another rate matching scheme a downlink indicator with said bit set to a second value.

3. The apparatus of claim 1, wherein the first rate matching scheme comprises a single port rate matching scheme defining resources reserved for channel reference symbols.

4. The apparatus of claim 1, wherein the first radio access type comprises a first radio access technology and the second radio access type comprises a second radio access technology.

5. The apparatus of claim 4, wherein the first radio access technology comprises a preceding generation technology to the second radio access technology.

6. The apparatus of claim 1 wherein the first radio access type uses contiguous spectrum and the second access mode uses a non-contiguous spectrum, or the second radio access type uses a broader non-contiguous spectrum than the first radio access type.

7. An apparatus, comprising:
at least one processor; and
at least one memory including computer program code, the at least one memory and computer program code configured to, with the at least one processor, cause the apparatus at least to perform:
providing at least a cell using a first radio access type;
supporting at least in said cell spectrum sharing with a second radio access type;
determining an operation mode of said cell at least based on number of devices, which use the first radio access type, connected to said cell;
using, at least when the number of devices is zero, in said cell a first operation mode, which is an operation mode, in which a minimum number of resources are reserved for downlink reference transmissions for the first radio access type; and
causing, in response to the operation mode being changed to the first operation mode or from the first operation mode, informing the operation mode change to an entity of the second radio access type with which the spectrum is shared in said cell of the first radio access type.

8. The apparatus of claim 7, wherein the at least one memory and computer program code are configured to, with the at least one processor, cause the apparatus further at least to perform:
reserving in the first operation mode no physical uplink control channel resources for the first radio access type;
detecting, when the first operation mode is in use, a first information indicating that the number of devices connected to said cell will change to be more than zero; and
changing the first operation mode to a second operation mode, in which physical uplink control channel resources are reserved for the first radio access type.

9. The apparatus of claim 8, wherein the at least one memory and computer program code are configured to, with the at least one processor, cause the apparatus further at least to perform:
determining, in response to the first information being an acceptance of a handover of a device or a device entering a connected mode, capability of the device; and
determining at least based on the capability a number of resources reserved for downlink reference transmissions for the first radio access type in the second operation mode.

10. The apparatus of claim 8, wherein the at least one memory and computer program code are configured to, with the at least one processor, cause the apparatus further at least to perform:
using in the second operation mode a preconfigured number of resources reserved for downlink reference transmissions for the first radio access type.

11. The apparatus of claim 7, wherein the at least one memory and computer program code are configured to, with the at least one processor, cause the apparatus further at least to perform:
sharing in the first operation mode random access channel resources reserved for the first radio access type with at least a cell of the second radio access type; and
separating in the second operation mode the random access channel resources reserved for the first radio access type from the random access resources of the cell of the second radio access type.

12. The apparatus of claim 7, wherein the first operation mode comprises a single port transmission mode.

13. An apparatus, comprising:
at least one processor; and
at least one memory including computer program code, the at least one memory and computer program code configured to, with the at least one processor, cause the apparatus at least to perform:
providing at least a cell using a second radio access type;
supporting at least in said cell spectrum sharing with a first radio access type;
receiving from an entity of the first radio access type, with which the spectrum is shared, information indicating whether a first operation mode, which is an operation mode, in which a minimum number of resources are reserved for downlink reference transmissions for the first radio access type, is in use;
in response to receiving an indication that the first operation mode is in use, indicating in a downlink control information transmitted from the apparatus to devices in the cell to use a first rate matching scheme, which defines a minimum number of resources reserved for downlink reference transmissions for the first radio access type; and in response to receiving an indication that the first operation mode is not in use, indicating in a downlink control information transmitted from the apparatus to devices in the cell to use another rate matching scheme.

14. The apparatus of claim 13, wherein the at least one memory and computer program code are configured to, with the at least one processor, cause the apparatus further at least to perform:
in response to receiving the indication that the first operation mode is in use, using physical uplink control channel resources for the first radio access type when scheduling transmissions of the second radio access type; and
in response to receiving the indication that the first operation mode is not in use, not using said physical uplink control channel resources for the first radio access type when scheduling transmissions of the second radio access technology.

\* \* \* \* \*